UNITED STATES PATENT OFFICE.

BENJAMIN TALBOT, OF PENCOYD, PENNSYLVANIA.

LINING FOR METALLURGICAL FURNACES.

SPECIFICATION forming part of Letters Patent No. 628,288, dated July 4, 1899.

Application filed October 28, 1897. Serial No. 656,708. (No model.)

*To all whom it may concern:*

Be it known that I, BENJAMIN TALBOT, a subject of the Queen of Great Britain and Ireland, and a resident of Pencoyd, Montgomery county, Pennsylvania, have invented certain Improvements in Linings for Metallurgical Structures, of which the following is a specification.

The object of my invention is to provide an extremely refractory lining for metallurgical structures—such as furnaces, converters, crucibles, molds, &c.—where high temperatures and destructive slags are employed.

I have found that carbid of silicon, (which in the crystalline form is commonly called "carborundum,") if formed into bricks or compressed into a lining for a metallurgical structure, is very refractory under high temperatures and resists fluxing action either of basic or acid slags used in steel, iron, or other metal manufacture. The carbid is preferably ground until it assumes a granular or powdered condition and is then mixed with some binding agent which will serve to retain it in shape either as a brick or as a lining. Either the crystalline or amorphous carbid may be used, preference being given to the amorphous carbid because that has hitherto been deemed a waste product and is consequently inexpensive. If the amorphous carbid is used, however, care should be taken to procure such as is free from silica, as free silica will flux away in the presence of a basic slag, materially affecting the integrity of the mass composing the lining. The carbid may contain some graphite due to its method of manufacture, but as graphite is neutral and highly refractory its presence is not an objection.

Many binding agents may be employed—such, for instance, as mineral or vegetable hydrocarbons like liquid tar, heavy oil, molasses, pitch, or rosin, or other binding agents, such as caustic lime or magnesia or plastic clay mixed with water, may be used—the character of the binding agent being determined in great measure by the character of the slag to which the linings are likely to be subjected, the aim being to employ such a binding agent as will not when subjected to the destructive action of such slag or the high temperature to which it is subjected materially lessen the refractory or cohesive power of the lining.

The binding agent which I prefer to employ is liquid coal-tar, which preferably while hot is mixed with the powdered carbid in sufficient quantity to cause the mass to bind together under suitable pressure. The compound thus produced may be formed into bricks which are afterward employed for lining the metallurgical structure, or the compound may form the lining by being tamped or pressed into place in the ordinary manner. In either case the heating of the structure will cause the volatile portion of the tar to be driven off, leaving a coke residue which will firmly bind together the particles of carbid, or, if desired, the bricks may be burned before being used to build up the lining of the structure. I do not, however, limit myself to any particular method of forming the lining, but claim, broadly, the use of carbid of silicon however applied as a refractory lining for metallurgical structures.

In making repairs to the lining the carbid may be used dry or moistened with water or mixed with any appropriate binding agent, according to the nature of the repairs.

The term "lining" as used in my specification and claims is intended to cover any part of a metallurgical structure which is brought into contact with the molten metal or slag or is otherwise subjected to intense heat, and hence this term includes, for instance, such parts as the blocks or bricks which are used as stoppers for the tapping-holes of ladles.

Having thus described my invention, I claim and desire to secure by Letters Patent—

1. A metallurgical structure having a neutral lining of amorphous carbid of silicon, freed from silica and combined with a binding agent.

2. A metallurgical structure having a neutral lining of carbid of silicon combined with a binding agent.

3. A metallurgical structure having a neutral lining of carbid of silicon combined with carbonaceous residue whereby the particles of carbid are held together.

4. The within-described compound for forming neutral linings for metallurgical structures, said compound consisting of carbid of silicon, and a binding agent.

5. The within-described compound for forming neutral linings for metallurgical structures, said compound consisting of amorphous carbid of silicon freed from silica and combined with a binding agent.

6. The within-described compound for forming neutral linings for metallurgical structures, said compound consisting of carbid of silicon and liquid tar.

7. A refractory furnace-lining, brick, or crucible, containing carbid of silicon and a binder.

8. A neutral brick or block for lining metallurgical furnaces, said brick or block consisting of carbid of silicon, and a carbonaceous residue, whereby the particles of carbid are bound together.

9. A neutral brick or block for lining metallurgical furnaces, said brick or block consisting of amorphous carbid of silicon freed from silica, and a binding agent whereby the particles of carbid are held together.

10. A refractory furnace-lining, brick, or crucible, containing amorphous carbid of silicon and a binder.

In testimony whereof I have signed my name to this specification in the presence of two subscribing witnesses.

BENJAMIN TALBOT.

Witnesses:
WILL. A. BARR,
JOS. H. KLEIN.